Sept. 20, 1966 A. J. HORSTMAN 3,273,809
REFINER SEAL
Filed April 22, 1963
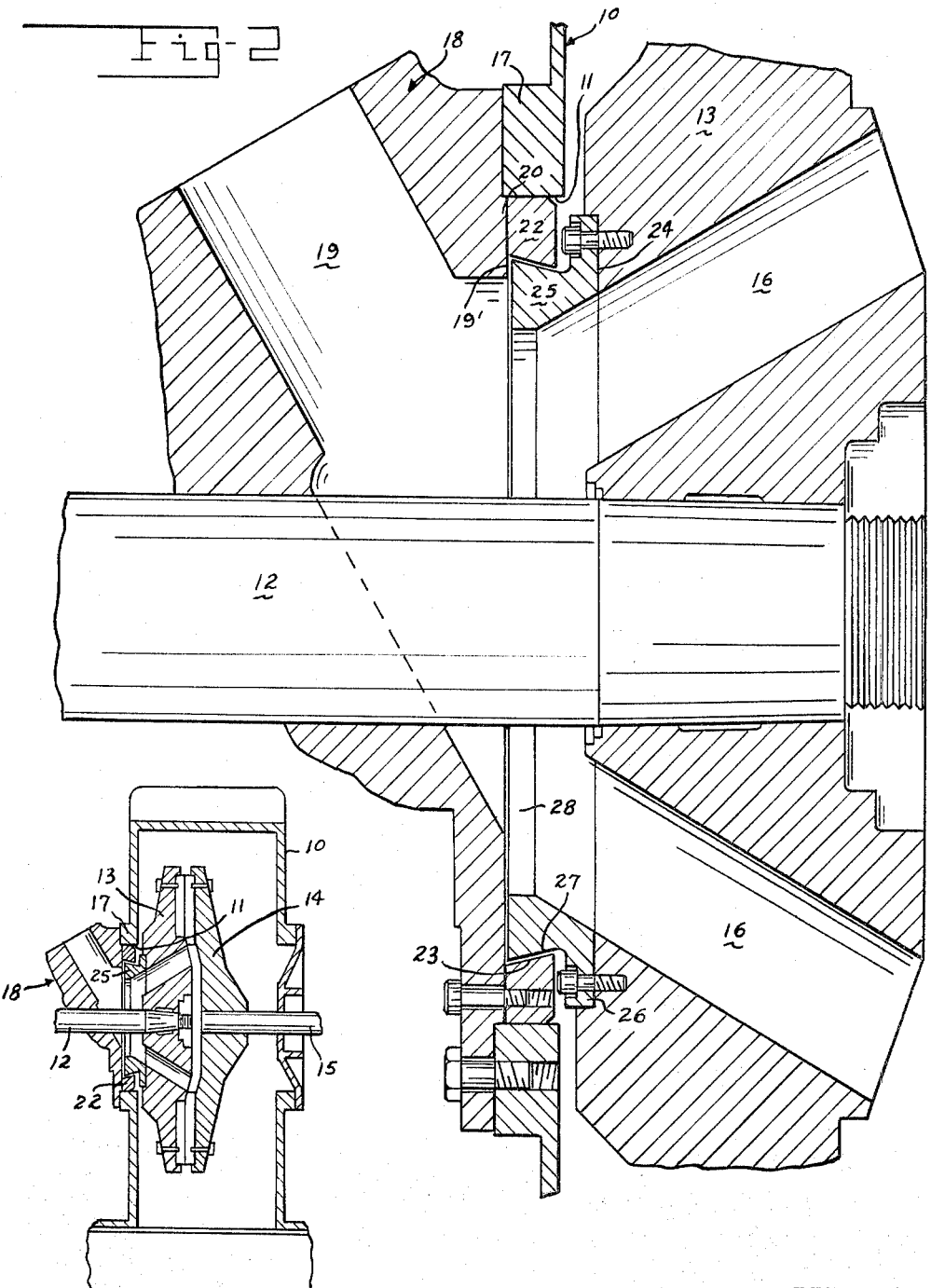
INVENTOR.
ANTON J. HORSTMAN
BY Tom Walker
ATTORNEY

3,273,809
REFINER SEAL
Anton J. Horstman, Houghton, Mich., assignor to Bauer
Bros. Co., Springfield, Ohio, a corporation of Ohio
Filed Apr. 22, 1963, Ser. No. 274,516
11 Claims. (Cl. 241—244)

This invention relates to pulp refining equipment. It features a ring seal a preferred embodiment of which provides improvements in double disc refiners.

A primary object of the invention is to provide a disc type pulp refiner unit which is economical to fabricate, more efficient and satisfactory in use, adaptable to a wide variety of applications and unlikely to malfunction.

Another object of the invention is provide a novel ring seal for use in material processing equipment.

A further object of the invention is to provide an improved means for creating a seal to bridge the relatively adjacent ends of a fixed and a relatively rotatable conduit member in a material processing system.

An additional object of the invention is to provide an improved ring seal for use at the inlet to a disc refiner.

Another object of the invention is to provide a novel ring seal assembly consisting of a pair of ring elements adapted to provide a seal which bridges the adjacent ends of a fixed conduit member and a relatively rotating conduit member, the ring elements having surface portions which overlap and position in relatively adjacent spaced relation and operate, on relative rotation thereof, to produce forces which prevent materials flowing through said conduit members from flowing therebetween. A further object of the invention is to provide a ring seal possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 of the drawings is a fragmentary cross-sectional view of a double disc refiner incorporating the improvements of the invention; and FIG. 2 is an enlarged view of a portion of the device illustrated in FIG. 1.

Like parts are indicated by similar characters of reference throughout the several views.

The drawings reveal a double disc refiner, but only so much thereof as necessary to disclose the present invention. They show a refiner housing 10 having an inlet opening 11 at one side. The opening 11 accommodates a drive shaft 12 one end of which mounts an open disc 13 in the housing 10. In opposed adjacent relation to the disc 13 in the housing 10 is a closed disc 14. The disc 14 mounts on one end of a drive shaft 15 which projects through the opposite side of the housing 10 coaxial with the shaft 12. The adjacent faces of the discs 13 and 14 mount refiner plates in a conventional manner which operate to refine materials which are passed therebetween.

The open disc 13 is a conduit member including divergent flow passages 16. The passages 16 are conically oriented about the shaft 12 and relatively diverge from their one ends which are adjacent and spaced from the inlet 11 and in direct alignment therewith.

Exteriorly of the housing 10, the inlet opening 11 is defined by a tubular projection 17. Fixed about the opening 11 to the outer face of the projection 17 is one end of a stock feed spout 18. The spout 18 provides an inclined delivery passage 19 which communicates with the opening 11 opposite the flow passages 16 in the disc 13. As may be seen in the drawings, the drive shaft 12 projects through and bears in one wall of the spout 18. As in any conventional disc refiner, each of the shafts 12 and 15 are connected to suitable drive means which produce a relative rotation of the opposed disc members 13 and 14. However, such means are not detailed since the details thereof are unnecessary for a complete disclosure of the present invention.

At the delivery end of its passage 19 the spout 18 includes a short tubular projection 20 which nests in the opening 11 in peripheral contact with the projection 17. The projection 17 also nests a ring element 22 which is bolted to the spout 18 in the end abutting relation to the projection 20.

The ring 22 is so dimensioned and so formed to define a shoulder 19' about the delivery end of the passage 19. Moreover, its inner surface 23 has the shape of a section of a cone, being inwardly convergent in respect to the housing 10.

The rear face of the disc 13, which is immediately adjacent and spaced from the ring 22, is centrally recessed to form an annular shoulder 24 which rims the entrance end of the flow passages 16. The shoulder 24 provides an abutment for projected flange 26 at one end of a ring 25. The flange 26 is bolted to the disc and so positions the ring 25 to rim the flow passages 16 and form a tubular guide for flow thereto.

The ring 25 is thereby fixed for rotation with the disc 13 and relative the fixed ring 22. The outer peripheral contour of the ring 25 is that of a section of a cone which expands in a direction outwardly from the flange 26. The conical portion of ring 25 positions inwardly of the ring 22 and has its outer surface 27, which is of a form to mate with the surface 23, nest in concentric spaced relation to the ring surface 23 so as to provide a slight clearance therebetween.

As is apparent from FIG. 2 of the drawings, the ring 22 overlaps and relatively contains the ring 25 with reference to the spout 18.

The inner peripheral surface of the ring 25 has a cylindrical contour in the section 28 thereof contained by the ring 22. From the section 28 it conically expands to rim the flow passages 16 and thereby provide for an expanding flow thereto from the feed spout 18, as will be further described. It is to be noted that the outer peripheral portion of the projected face of the ring 25 is positioned in adjacent closed spaced relation to the shoulder 19' of spout 18.

As in a conventional double disc refiner, the housing 10 creates a refining chamber for the disc assemblies 13 and 14 and its lower portion serves as a discharge chute for material refined therebetween.

As will be further described, the ring elements 22 and 25 are so arranged to form a bridge and produce a seal between the spout 18, which constitutes a fixed conduit member, and the disc 13, which constitutes a relatively rotating conduit member. This seal is effective to prevent raw materials which flow from the spout 18 to the flow passages 16 from sifting through to the discharge portion of the housing 10 and thereby degenerating the quality and substance of the refined materials which pass therethrough.

The nature of the seal becomes particularly evident from the following operation.

As a preliminary to pulp refining the discs 14 and 13 are energized to relatively rotate. Then stock consisting of raw wood chips in a fluid vehicle is delivered through the passage 19 of the spout 18 to the inlet opening 11. As stock flows through the inlet 11 to enter the ring 25, it passes the relatively adjacent surfaces of spout shoulder 19' and the ring 25. In an inoperative condition of the ring, the slight space between these surfaces would provide access for flow of stock between the ring surfaces 23 and 27. However, as the stock flows past the shoulder 19' during refiner operation and a portion inherently attempts to pass about the projected extremity of the spinning ring 25 and through the clearance between the surfaces 23 and 27 of the relatively concentric rings 22 and 25, it will meet a repelling influence. The ring 25 is so formed at its outer periphery to produce forces which become progressively greater from a position adjacent the flange 26 to its expanded extremity adjacent the shoulder 19'. These forces, apparently centrifugal forces, are imposed on any substance that attempts to move into the space between the surfaces 27 and 23 and forces it back into the main flow path to move with the incoming stock through the ring 25 and to enter the flow passages 16 in a relatively smooth flow pattern. If any element of the stock material should enter the clearance space between the surfaces 23 and 27, the rotation of the ring 25 and the forces produced thereby tends to force such particle to move upwardly over the expanding surface 27 to the shoulder 19' and outwardly adjacent the projected face of the ring 25 to the main flow passage bridging the spout 18 and the disc 13.

Thus, any material which in flow from the spout 18 to the disc 13 might seek to pass through the clearance between the rings 22 and 25 will be pumped out by what are apparently the centrifugal forces which develop in the process of rotation of the ring 25 relative to ring 22. Therefore, the invention produces a seal to bridge adjacent relatively rotating conduits consisting of two ring elements surface portions of which overlap and are formed in a manner that on the relative rotation they inherently prevent inflow therebetween from flow through the conduits. The invention prevents accumulation of material in the seal structure in a manner believed obvious and thereby avoids friction of a nature which might reduce the operating efficiency of a disc refiner.

As described, the invention therefore provides a seal which is designed to prevent any particles of raw material from entering the finished refining zone of a refiner unit. The advantages of the invention are exemplified by the character and quality of a double disc refiner unit in which it is employed.

While the seal of the invention has been particularly described in reference to a pulp refiner unit, it will be obvious to those versed in the art that it is equally advantageous for many uses in various material processing systems.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A seal device to form a bridge between a fixed and a relatively rotating conduit member including an apertured means for application at the exit from said fixed member, the aperture defining surface portion of which is convergent in the direction of said rotating member, and apertured means fixed to said rotating member, about the entrance thereto, a surface portion of which mates with and positions in adjacent relation to said convergent surface whereby relative rotation of the mating surfaces will produce forces which operate to eject material attempting to flow therebetween in the course of flow through said conduit members.

2. A seal device for forming a bridge between a relatively fixed and a relatively rotating conduit member consisting of a pair of annular elements one of which fixes to said fixed member, the other of which fixes to said rotating member, said elements having oppositely tapered surface portions which position in adjacent relation with clearance therebetween and are effective on relative rotation to produce ejecting forces in reference to materials which tend to flow therebetween during flow thereof through said conduit members.

3. In a refiner unit including a pair of opposed relatively rotatable discs, at least one of which is open for delivery therethrough of material to be refined between said discs and a housing enclosing said discs to provide a refining chamber having an inlet opening in communication with said open disc, a first ring element nested in said inlet opening, a second ring element fixed to said open disc to project and nest concentric to said first ring element, the inner surface of said first ring element and the outer surface of said second ring element being positioned in immediately adjacent relation and respectively formed as concentric cone sections to produce, on relative rotation of said ring elements, a force to inhibit the material flowing through said inlet to said open disc from flowing therebetween.

4. A seal device for the inlet to a disc refiner or the like including a housing containing opposed relatively rotatable discs, at least one of which is open for delivery therethrough of material to be refined between said discs, comprising means defining an opening to said housing providing access to said open disc and a ring for connection to the open disc positioning in adjacent relatively rotatable relation to the aforementioned means to provide a bridge from the opening to the open disc, said means defining said opening and said ring having relatively adjacent surface portions with mating tapers so inclined that on relative rotation they operate to produce forces which influence an automatic ejection of materials which attempt to flow therebetween during flow thereof from said opening to said open disc.

5. In a refiner unit including a pair of opposed relatively rotatable discs, at least one of which is open for delivery therethrough of material to be refined between said discs, and a housing enclosing said discs to provide a refining chamber having an inlet opening in communication with said open disc, means framing said inlet opening having a gradually reduced cross-section at its interior surface in a sense inwardly of said opening and means in connection with said open disc having a projected surface portion thereof contained by said frame means, said surface portion of said means in connection with said open disc being formed to cooperate with said frame means on rotation of said open disc to produce forces which inhibit passage thereby of materials being flowed through said inlet opening to said open disc.

6. In a refiner unit, a housing having an inlet opening to admit material for refining, relatively rotatable refining means in said housing including a rotatable disc having a flow passage facing said inlet opening and having a circular flange surrounding said passage therein and projecting outwardly into the said inlet opening in said housing, said flange having inner and outer ends relative to said disc and having an increasing diameter toward its outer end defining on its outer periphery an inclined surface conforming to a section of a cone, and stationary means in the inner periphery of said inlet opening receiving said flange and having an inner periphery in complementary adjacent relation to the outer periphery thereof.

7. A refiner unit according to claim 6, characterized in that the overlapping peripheries of said flange and of said stationary means are continuously inclined, said inclining peripheries being the only adjacent overlapping portions between said flange and said inlet opening.

8. A refiner unit according to claim 6, characterized by a chute mounted to said housing in closing relation to said inlet opening, an inner face of said chute being in overlapping relation to the space between said overlapping peripheries of said flange and said stationary means.

9. In a refiner unit, a housing having an inlet opening to admit material for refining, a stationary ring member installed in said inlet opening, disc means in said housing including a relatively rotatable disc having an annular flange projecting axially outward therefrom and received in said inlet opening in adjacent overlapping relation to the periphery of said inlet opening, the overlapping portions of said flange and said ring member being inclined to define therebetween a narrow outwardly flaring passage for the application of pressure forces resisting entrance of material for refining into said passage from the outer end thereof.

10. In a refiner unit, a housing having an inlet opening to admit material for refining, disc means in said housing including a rotatable disc having its back facing said inlet opening and having a passage from the back to the front thereof to conduct said material therethrough, a flange on the back of said rotatable disc extending outward into said inlet opening, said flange progressively increasing in diameter, in its outside dimension toward the outer end thereof, and means in connection with said housing rimming said inlet opening and having an inner periphery in adjacent complementary relation to the outer periphery of said flange, said last named means and said flange defining an outwardly flaring narrow passage therebetween inhibiting in response to rotation of said rotatable disc entrance of material for refining into said housing around said flange.

11. A refiner unit according to claim 10, characterized in that the inner periphery of said flange is aligned with said passage through said rotatable disc, said passage inclining relative to the axis of said disc and the inner periphery of said flange similarly inclining as a continuation thereof.

References Cited by the Examiner

UNITED STATES PATENTS

| | | | |
|---|---|---|---|
| 692,243 | 2/1902 | Copenhaver | 241—255 |
| 2,214,707 | 9/1940 | Markley | 277—133 X |

FOREIGN PATENTS 35,965   1/1909   Austria.

SAMUEL ROTHBERG, *Primary Examiner.*